US005753365A

United States Patent [19]

Morimoto et al.

[11] Patent Number: 5,753,365
[45] Date of Patent: May 19, 1998

[54] RUBBER COMPOSITION AND ALL SEASON TYPE PNEUMATIC TIRES MADE FROM A RUBBER COMPOSITION

[75] Inventors: Yoshiyuki Morimoto; Koji Yamauchi; Seiichiro Iwafune; Tatsuro Hamada; Masanori Aoyama; Eiji Yamanaka, all of Tokyo; Koichi Nagakura; Koji Ishiguchi, both of Ichihara, all of Japan

[73] Assignees: Bridgestone Corporation, Tokyo; Ube Industries, Ltd., Yamaguchi-Pref., both of Japan

[21] Appl. No.: 596,755

[22] Filed: Feb. 5, 1996

Related U.S. Application Data

[63] Continuation-in-part of Ser. No. 255,818, Jun. 7, 1994, abandoned, and Ser. No. 307,411, Sep. 19, 1994, abandoned, which is a continuation-in-part of Ser. No. 894,477, Jun. 5, 1992, abandoned, said Ser. No. 255,818, is a continuation of Ser. No. 894,728, Jun. 5, 1992, abandoned.

[30] Foreign Application Priority Data

Jun. 7, 1991 [JP] Japan ................... 3-162,435
Jun. 7, 1991 [JP] Japan ................... 3-162,436
Apr. 21, 1992 [JP] Japan ................... 4-101,269

[51] Int. Cl.$^6$ .......................................... B60C 11/00
[52] U.S. Cl. .......................... 428/357; 428/407; 428/402; 152/208; 152/209 R; 152/210; 524/4; 524/5; 524/473
[58] Field of Search ................... 524/4, 5, 473; 428/402, 357, 407; 152/209 R, 208, 210

[56] References Cited

U.S. PATENT DOCUMENTS

| | | | |
|---|---|---|---|
| 3,901,868 | 8/1975 | Ueno et al. | 526/335 |
| 4,215,021 | 7/1980 | Ogawa et al. | 525/536 |
| 4,255,296 | 3/1981 | Ogawa et al. | 524/255 |
| 4,257,468 | 3/1981 | Ogawa et al. | 524/251 |
| 4,274,462 | 6/1981 | Ogawa et al. | 152/209 R |
| 4,323,625 | 4/1982 | Coran et al. | 524/14 |
| 4,499,228 | 2/1985 | Ogawa et al. | 525/232 |
| 4,506,031 | 3/1985 | Henderson et al. | 502/162 |
| 4,548,980 | 10/1985 | Nagata | 524/495 |
| 4,790,365 | 12/1988 | Sandstrom et al. | 525/236 |
| 4,912,145 | 3/1990 | Wideman | 525/237 |
| 4,960,834 | 10/1990 | Wideman | 524/495 |
| 4,967,818 | 11/1990 | Gartland et al. | 524/257 |
| 5,011,896 | 4/1991 | Bell et al. | 152/209 |
| 5,147,477 | 9/1992 | Mouri et al. | 152/209 R |

FOREIGN PATENT DOCUMENTS

| | | |
|---|---|---|
| 1119929 | 3/1982 | Canada. |
| 0307341 | 3/1989 | European Pat. Off.. |
| 0364391 | 4/1990 | European Pat. Off.. |
| 3703480 | 10/1986 | Germany. |
| A51-28115 | 8/1976 | Japan. |
| A55-135149 | 10/1980 | Japan. |
| A58-199203 | 11/1983 | Japan. |
| A60-137945 | 7/1985 | Japan. |
| A62-283001 | 12/1987 | Japan. |
| A63-89547 | 4/1988 | Japan. |
| A63-90402 | 4/1988 | Japan. |
| A64-63401 | 3/1989 | Japan. |
| A-4-359939 | 12/1992 | Japan. |

OTHER PUBLICATIONS

World Patents Index Latest, Week 8819, for JP-A-63-75046. (1988).
Bridgestone #1, "Radial Tires For Cars" (1980).
CA #94:176491.
Bridgestone #2, "Times with Good Ice Skid Resistance" (1988).
CA #109:151229.

Primary Examiner—Cecilia J. Tsang
Assistant Examiner—Patrick R. Delaney
Attorney, Agent, or Firm—Sughrue, Mion, Zinn, Macpeak & Seas, PLLC

[57] ABSTRACT

A rubber composition includes a rubber component and particulates of a crystalline syndiotactic-1,2-polybutadiene resin dispersed therein. The particulates have an average particle diameter of 1 to 500 μm, and the melting point of the crystalline syndiotactic-1,2-polybutadiene resin is not less than 110° C. The compounding ratio of the resin is 5 to 60 parts by weight relative to 100 parts by weight of the rubber component. The rubber composition is useful for tires, other rubber articles, etc. With respect to tires in particular, a pneumatic tire includes a rubber composition used for a tread, wherein the rubber composition includes a rubber component and particulates of crystalline syndiotactic-1,2-polybutadiene resin. The matrix portion of the tread rubber other than the above particulates is preferably a foamed rubber.

31 Claims, 1 Drawing Sheet

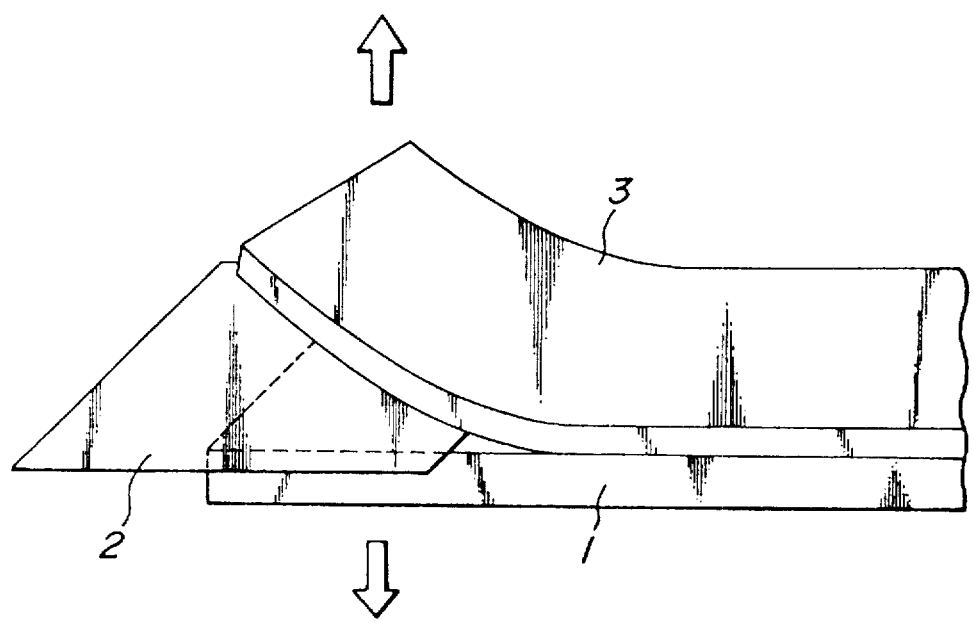
FIG_1

RUBBER COMPOSITION AND ALL SEASON TYPE PNEUMATIC TIRES MADE FROM A RUBBER COMPOSITION

This is a continuation-in-part of application Ser. No. 08/255,818 filed Jun. 7, 1994 now abandoned, which is a continuation of application Ser. No. 07/894,728 filed Jun. 5, 1992, now abandoned, and this is also a continuation-in-part of application Ser. No. 08/307,411 filed Sep. 19, 1994 now abandoned, which is a continuation-in-part of application Ser. No. 07/894,477 filed Jun. 5, 1992, now abandoned.

BACKGROUND OF THE INVENTION

(1) Field of the Invention

The present invention relates to a rubber composition having a large slip friction resistance and a small specific gravity, while fracture resistance or wear resistance are not lost. Also, the present invention relates to pneumatic tires, more particularly, so-called all season type pneumatic tires which have remarkably improved drivability, brakability and cornering stability on ice and snow roads without deteriorating cornering stability or durability in the summer season.

(2) Related Art Statement

With respect to tires as well as other rubber articles, needs have been recently increasing for rubber materials having large slip friction resistance under various use conditions without losing fracture resistance or a wear resistance conventionally possessed.

On the other hand, needs have been increasing for lightening rubber articles from the standpoint of terrestrial environmental conservation.

For such needs, for example, the slip friction resistance is increased by using a styrene-butadiene rubber having a large tan δ and obtained by emulsion polymerization, increasing a charged amount of carbon black and adding a great amount of oil in view of appropriate rubber hardness and practical processability. However, the slip friction resistance currently required cannot be fully obtained by the above compounding conditions. Further, an amount of heat generated inside the rubber article increases under dynamic use conditions to conspicuously lower durability due to degradation of rubber, and the specific gravity of the rubber article becomes greater.

Besides the above method, solution-polymerized styrene-butadiene rubbers have been recently investigated in various ways, and there have been proposed methods of using a solution-polymerized styrene-butadiene rubber having a specific molecular structure or compounding specific fibers or filler into a rubber.

However, although the slip friction resistance can be considerably improved on ordinary roads by specifying the molecular structure of the polymer to be employed, satisfactory slip friction resistance cannot be obtained on ice.

Further, when the special fibers or filler is compounded into rubber, good effect on the slip friction resistance can be obtained even on ice. However, since the fibers or filler added acts as a foreign material in the rubber, fracture resistance or wear resistance is remarkably deteriorated.

As mentioned above, it is a present situation that a rubber composition having a large slip friction resistance on roads in any state and a small specific gravity without losing fracture resistance or wear resistance has not yet been obtained.

In addition, demands have been increasing recently for so-called all season type tires which can be used even in the winter season, without being exchanged, as in the summer season. Such tires are required to possess substantially the same dry gripping power, wet gripping power, cornering stability, durability and low fuel consumption even in the winter season as well as in the summer season, and also to possess sufficient drivability and brakability even on ice and snow.

A tread rubber used in such tires needs to satisfy requirements for a tread rubber required in the summer season, and also its hardness at low temperatures needs be lowered. In view of this, methods have been formerly known to use a polymer having a low glass transition temperature or employ a softener or plasticizer capable of appropriately keeping the modulus of elasticity at low temperatures.

However, although the former method exhibits some improvement on tire performances in a ice-snow temperature range due to a hysteresis loss characteristic of such a polymer, brakability or cornering stability is unfavorably insufficient on wet or dry roads. The latter method is disclosed in Japanese Patent application Laid-open No. 55-135,149, 58-199,203 or 60-137,945, and it is pointed out that any of the techniques of these publications has a problem that as compared with an improved degree of the performances on ice and snow, wear resistance and durability on running on general roads are more adversely affected.

Although relatively excellent tire performances on ice and snow are indeed exhibited on so-called dry-on-ice conditions, i.e., a relatively low temperature range not more than −5° C., in any of the above techniques, a sufficient coefficient of friction cannot be obtained with respect to tire performances on ice and snow in a wet state near 0° C., i.e., in so-called wet-on-ice conditions. Therefore, it cannot be said that drivability, brakability and cornering stability are fully improved with respect to the wet-on-ice conditions.

SUMMARY OF THE INVENTION

It is an object of the present invention to provide a rubber composition having a large slip is friction resistance on roads in any state and also a small specific gravity without losing fracture resistance or wear resistance.

It is another object of the present invention to provide a pneumatic tire called an all season type pneumatic tire in a strictly actual sense, which can not only fully maintain cornering stability, durability and low fuel consumption in the summer season but also have satisfactory drivability and brakability both in the dry-on-ice conditions and in the wet-on-ice conditions.

Inventors' investigations have revealed that even when interface bonds are formed between rubber and a special particulate compounding chemical incorporated into the rubber composition, the thus formed interface bonds are not necessarily sufficient if dynamic external deformation is intermittently inputted, for example, in the case of tires.

Inventors have made further investigations to form effective interface bonds between rubber and the particulate material, and found that the above problems can be solved by forming a co-crosslinked structure between the added particulate material and rubber. Based on this discovery, present inventors have accomplished the rubber composition portion of the present invention.

In addition, present inventors have strenuously investigated performances of rubbers of treads of the above-mentioned all season or studless tires on ice and snow, particularly on ice and snow roads in a wet state, and have discovered that when a rubber composition including particulates of a syndiotactic-1,2-polybutadiene resin having a specific structure is used as a rubber composition of the tread, tire performances on ice and snow can be remarkably improved, while cornering stability, durability, etc. required in the summer season or in running on ordinary roads are not deteriorated. The tire portion of the present invention has been accomplished based on this discovery.

That is, the rubber composition according to the present invention includes a rubber component and particulates of a crystalline syndiotactic-1,2-polybutadiene resin, wherein the average particle diameter of the resin is 1 to 500 μm, the melting point of the resin is not less than 110° C., the particulates have an average ratio between a major axis and a minor axis of not more than 6, and the compounding ratio of the resin is 5 to 60 parts by weight relative to 100 parts by weight of the rubber component.

In another embodiment of the present invention, the rubber composition includes a rubber component and 5 to 60 parts by weight of particulates of a crystalline syndiotactic-1,2-polybutadiene resin relative to 100 parts by weight of said rubber component, wherein the particulates have an average particle diameter of 1 to 500 μm, the crystalline syndiotactic-1,2-polybutadiene resin has a melting point of not less than 110° C., and the crystalline syndiotactic-1,2-polybutadiene resin has a reduced viscosity $\eta_{sp}/c$ of not less than 0.70.

The pneumatic tire according to the present invention is characterized in that a rubber composition is used for a tread, which rubber composition includes a rubber component and particulates of a crystalline syndiotactic-1,2-polybutadiene resin or particulates of specific syndiotactic-1,2-polybutadiene resin-composite material, the particulates having an average particle diameter of 10 to 500 μm and a melting point of said crystalline syndiotactic-1,2-polybutadiene resin being not less than 110° C., and a compounding ratio of the resin being 5 to 60 parts by weight relative to 100 parts by weight of the rubber component. The rubber component constituting a matrix portion of the tread rubber other than the above particulates is preferably is a foamed rubber. In this case, it is confirmed that the tire performances on ice and snow can be further improved.

Further, an object of the present invention is attained by a pneumatic tire which uses, as a tread rubber, a rubber composition including a rubber component and resin-composite particulates having the average particle diameter of 10 to 500 μm and composed of a crystalline syndiotactic-1,2-polybutadiene resin having a melting point of not less than 110° C. and a carbon black, a compounding ratio of the resin-composite particulates being 5 to 60 parts by weight relative to 100 parts by weight of the rubber component, and the resin and the carbon black satisfying the following inequations: 250<X+10Y<1300 in which X is a nitrogen-adsorption specific surface area (unit: m²/g) and Y is the compounding ratio of the carbon black (parts by weight) relative to 100 parts by weight of the resin. According to this pneumatic tire, the rubber component constituting a matrix portion of the tread rubber composed of the above rubber composition other than the resin-composite particulates is preferably a foamed rubber.

BRIEF DESCRIPTION OF THE DRAWING

For a better understanding of the invention, reference is made to the attached drawing, wherein:

FIG. 1 is a view illustrating a peeling test for examining the co-crosslinkability between rubber and resin

DETAILED DESCRIPTION OF THE INVENTION

The particulates of syndiotactic-1,2-polybutadiene resin used in the present invention need to have an average particle diameter of 1 to 500 μm. If the average particle diameter is less than 1 μm, slip friction resistance aimed at by the present invention cannot be sufficiently improved. On the other hand, if the average particle diameter is more than 500 μm, fracture resistance and wear resistance are unfavorably deteriorated. The average particle diameter of the particulate resin used in the present invention is preferably 8 μm–480 μm, and more preferably 100 μm–480 μm.

The syndiotactic-1,2-polybutadiene resin used in the present invention needs to be in the particulate form. The average ratio M between the major axis and the minor axis of the resin particulates is preferably not more than 6, more preferably not more than 4, in the state that the resin is kneaded into the rubber composition. If the resin is used in the form of micron pile fibers, the resin is oriented during processing the rubber mixture, for example, rolling or extruding, so that enlargement of coefficient of friction aimed at by the present invention unfavorably depends upon the direction.

An M value in the range of not more than 6 is attained as follows.

The 1,2-SPBD is cooled to −80° C. or less with liquid nitrogen, and is charged and milled in a mill. A given amount of the 1,2-SPBD may be charged and milled into the mill, while the milled 1,2-SPBD is being continuously discharged through a discharge opening. Thereby, the M value is controlled to not more than 6. If the cooled temperature of the 1,2-SPBD is higher than −80° C., whiskers are formed or the M value becomes more than 6.

Further, such particulates of the syndiotactic-1,2-polybutadiene resin need to have a melting point of not less than 110° C. The melting point of the particulate resin is preferably 115° C.–200° C., and more preferably 120° C.–195° C. Even more preferably, the melting point of the particulate resin is 140° C.–180° C. The syndiotactic-1,2-polybutadiene resin having a melting point of less than 110° C. is not preferable, because its crystallinity is low and hardness of the particulates themselves is small. Further, since such particulates are softened or deformed due to internal heat generation under dynamic use conditions, slip friction resistance cannot be improved as desired.

If the ratio of the above syndiotactic-1,2-polybutadiene resin is less than 5 parts by weight relative to 100 parts by weight of the rubber component in the rubber composition, improvement on the slip friction resistance of the resulting rubber article cannot almost be recognized, and contribution to reduction in the specific gravity is small. On the other hand, if the ratio of the syndiotactic-1,2-polybutadiene resin is more than 60 parts by weight relative to 100 parts by weight of the rubber component, slip friction resistance of the resulting rubber article is improved with reduced specific gravity, whereas fracture resistance and wear resistance of the rubber article are not only largely deteriorated but also processability of the rubber composition is conspicuously deteriorated to make the rubber composition practically unsuitable.

Since the 1,2-SPBD is lighter (smaller specific gravity) than carbon black, the use of SPBD instead of a part of carbon black makes the weight of the tire lower. The SPBD is crystalline and therefore is in the form of hard particles, and it has co-vulcanizability with rubber. Accordingly, the SPBD can function as a reinforcing filler. The melting point and the particle diameter of the SPBD play important roles. For example, if the melting point is too low, the particulates of the SPBD will be melted due to the heat generation of the tire, which adversely affects the function of the SPBD as a filler. Further, if the particle diameter of the SPBD is too large, the co-vulcanizability becomes poor. On the other hand, if the particle diameter decreases, the surface area of the SPBD per unit volume increases to improve the co-vulcanizability. However, the performance on ice becomes poorer as the particle diameter decreases. Thus, a range of 8–480 µm is preferred.

According to the present invention, the reduced viscosity ($\eta_{sp}/c$) of the syndiotactic-1,2-polybutadiene resin (measured in a solution of o-dichlorobenzene at 135° C.) is not less than 0.70. Preferably, it is 0.9 to 5.0. If the reduced viscosity is less than 0.70, the rubber composition becomes soft or deformed due to internal heat generation under dynamic use condition. Thus, sliding wear resistance and ice skid resistance cannot be sufficiently improved. On the other hand, no upper limit need be imposed upon the reduced viscosity of the syndiotactic-1,2-polybutadiene resin. However, in general, the upper limit of the reduced viscosity is not more than 5, because if the reduced viscosity is excessively high, tensile strength or wear resistance is deteriorated, and production becomes difficult.

The reduced viscosity ($\eta_{sp}/c$) of the syndiotactic-1,2-polybutadiene resin can be set as desired in a well known method in the art.

The reduced viscosity ($\eta_{sp}/c$) of the syndiotactic-1,2-polybutadiene resin is measured as follows:

(1) The syndiotactic-1,2-polybutadiene resin is dissolved in o-dichlorobenzene containing 0.3 wt % BHT at 140° C. (1,2-SPBD/o-dichlorobenzene=100 mg/50 ml).

(2) About twenty ml of the resulting 1,2-SPBD solution is charged into a Ubbelohde's viscometer set in an oil thermostat vessel at 135° C. After the system is stabilized at 135° C., the time period required for the solution to spontaneously fall is measured as Ts.

(3) After the Ubbelohde's viscometer is washed with o-dichlorobenzene at 135° C. and dried, the time period required for o-dichlorobenzene to spontaneously fall is measured at To in the same manner as in the above step (2).

(4) The $\eta_{sp}/c$ is determined as follows:

$\eta_{sp}/c=(Ts/To-1)/\text{weight of sample}\times 2$

The reduced viscosity $\eta_{sp}/c$ of the 1,2-SPBD representing the molecular weight may be set at an appropriate level based on a polymerization temperature. For example, it was empirically confirmed that when benzene was used as a polymerization solvent and the concentration of a monomer was set at 20 wt %, the relationship between the polymerization temperature and the reduced viscosity $\eta_{sp}/c$ was as follows:

Polymerization

| temp. (°C.) | 0 | 10 | 20 | 25 | 28 | 30 |
|---|---|---|---|---|---|---|
| $\eta_{sp}/c$ | 3.75 | 2.20 | 1.10 | 0.75 | 0.62 | 0.59 |

Although the relationship between the polymerization temperature and the reduced viscosity $\eta_{sp}/c$ shifts depending upon the kind of solvent and the concentration of monomer employed, such shifting will be able to be easily determined by a skilled person in the art without undue experimentation.

The above syndiotactic-1,2-polybutadiene can be produced according to a process disclosed in Japanese patent publication No. 53-39,917, 54-5,436 or 56-18,005. However, the process of producing the syndiotactic-1,2-polybutadiene used in the present invention is not limited to those in these publication.

Desirably, the rubber composition is produced by kneading at a kneading temperature and vulcanizing at a vulcanizing temperature such that the melting point of the resin is higher than the kneading temperature and the vulcanizing temperature.

In the present invention, the kind of the rubber constituting the rubber composition in which the composite particulates of the syndiotactic-1,2-polybutadiene resin are incorporated is not necessarily limited to any specific ones, and ordinarily used rubber may be employed. For example, as the rubber component, natural rubber, polyisoprene rubber, polybutadiene rubber, styrene-butadiene copolymer rubber, butyl rubber, halogenated butyl rubber, and ethylene-propylene diene rubber may be preferably used singly or in combination with each other. That is, natural rubber and synthetic rubbers may be used. As specific examples of the synthetic rubbers, mention may be made of solution-copolymerized styrene-butadiene rubber, emulsion-copolymerized styrene-butadiene rubber, polybutadiene rubber, butyl rubber, halogenated butyl rubber, and ethylene-propylene-diene terpolymer. As preferable rubber components, mention may be made of natural rubber and diene-based synthetic rubber. Further, natural rubber or a mixture of natural rubber and butadiene rubber is more preferable.

Needless to say, a compounding agent ordinarily used in the rubber industry, for example, another polymer, carbon black, a vulcanizer, a vulcanizing accelerator, etc. may be compounded into the rubber composition according to the present invention in appropriate amounts.

Since the highly crystalline syndiotactic-1,2-polybutadiene resin is dispersed in the rubber composition according to the present invention, the rubber composition has a structure having the hard particulate material exposed to the surface of the rubber composition. Thus, excellent slip friction resistance can be attained even on wet roads and ice roads.

The syndiotactic-1,2-polybutadiene resin forms a tough crosslinked structure between rubber through vulcanization or the like. Therefore, even when the rubber composition according to the present invention is used for the rubber article, such as a tire, to which dynamic external deformation is intermittently applied, the particulates will not almost be peeled or slip off from the rubber as matrix, contrary to the conventional rubber compositions. Consequently, fracture resistance and wear resistance are largely improved.

The first aspect of the tire portion of the present invention will be now explained in more detail.

First, the average particle diameter of the particulates of the syndiotactic-1,2-polybutadiene resin used in the present invention needs to be in a range of 10 to 500 µm. The reason is that if the average particle diameter is less than 10 µm, tire performances on ice and roads as aimed at by the present invention are not sufficient. On the other hand, if the average particle diameter is more than 500 µm, although some effects are recognized with respect to the tire performances on ice and snow, it is undesirable because other performances such as wear also required for the tire are deteriorated. The syndiotactic-1,2-polybutadiene resin used in the present invention needs to be in the particulate form. The average ratio M between the major axis and the minor axis of the resin particulates is preferably not more than 6, more preferably not more than 4, in the state that the resin is kneaded into the rubber composition and when the major axis and the minor axis are measured as viewed in a circumferential section or a radial section of the tread. That is, in order to improve drivability or brakability on ice and snow, it is required that the syndiotactic-1,2-polybutadiene resin is dispersed in the rubber composition in the particulate form, not in the form of microorganic pile fibers.

The syndiotactic-1,2-polybutadiene resin has usually crystallinity. In the present invention, the crystalline syndiotactic-1,2-polybutadiene resin has a melting point of not less than 110° C. The reason is that if the melting point is less than 110° C., the resin is softened, deformed or partially or entirely melted when the resin is added and kneaded into the rubber component on compounding. Thus, since the desired average particle diameter cannot be maintained, improved tire performances on ice and snow as aimed at by the present invention disappear.

Further, it is necessary that 5 to 60 parts by weight of the above syndiotactic-1,2-polybutadiene resin is incorporated in the rubber composition for the tread of the pneumatic tire of the present invention relative to 100 parts by weight of the rubber component.

The reason is that if the compounding ratio is less than 5 parts by weight, improved performances on ice and snow as desired can almost hardly be attained, whereas if more than 60 parts by weight of the resin is incorporated relative to 100 parts of the rubber component, other tire performances such as wear resistance are not only deteriorated, but also processability during the production of the tire is largely deteriorated, thereby rendering the pneumatic tire actually impractical.

In the present invention, it is unnecessary to limit the kind of the rubber component constituting the rubber composition in which the syndiotactic-1,2-polybutadiene resin is incorporated as well as the kinds of a filler and other chemical to any specific ones, and ordinary rubber, filler, chemical, etc. may be employed.

For example, as the rubber component, natural rubber, polyisoprene rubber, polybutadiene rubber, styrene-butadiene copolymer rubber, styrene-isoprene-butadiene terpolymer, styrene-isoprene copolymer rubber, and isoprene-butadiene copolymer rubber may be recited. The rubber composition used in the tread may include a filler, an antioxidant, a vulcanizing agent, a vulcanization accelerator, etc. The kinds and the amounts of these additives may be selected among the ordinary ranges, and are not limited to any specific ones.

According to the present invention, it is preferable that the tread rubber has closed cells at a foaming rate of 3 to 35%. Such closed cells are effective in exhibiting excellent performances on ice and snow through increasing microscopic water absorption-drainage effect due to the cells in a state that ice is abundant with water melted on its surface near 0° C. The foaming may be effected either by using a foaming agent or by mixing with a gas under high pressure. If the foaming rate is less than 3%, the foaming effect cannot be sufficiently exhibited. On the other hand, if the foaming rate is more than 35%, the rigidity of the tread becomes insufficient. In this case, wear resistance lowers and occurrence of cracks on bottoms of grooves becomes greater.

The foaming rate Vs of the foamed rubber is expressed by the following formula:

$$Vs=\{(\rho_0-\rho_1)/(\rho_1-\rho_9)-1\}\times 100(\%) \quad (1)$$

in which $\rho_1$ is a density of the foamed rubber (g/cm³), $\rho_0$ is a density of a solid phase of the foamed rubber (g/cm³), and $\rho_9$ is a density of a gas phase inside the cells in the foamed rubber (g/cm³). The foamed rubber is constituted by the solid phase, and voids (closed cells) defined by the solid phase, that is, a gas phase inside the cells. The density $\rho_9$ of the gas phase is extremely small, i.e., almost near zero, and is extremely far smaller than the density $\rho_1$ of the solid phase. Therefore, the above formula (1) may be approximated to $Vs\{(\rho_0-\rho_1)-1\}\times 100(\%)$.

In the pneumatic tire according to the present invention, the ordinary rubber or foamed rubber is composition in which the above-mentioned syndiotactic-1,2-polybutadiene resin is incorporated may be arranged in a cap portion of the tread having a cap-and-base construction.

Next, the second aspect of the tire portion of the present invention will be explained in more detail.

As mentioned above, the syndiotactic-1,2-polybutadiene resin also employed in the second aspect of the present invention usually has crystallinity. The crystalline resin needs to have the melting point of not less than 110° C. The reason is that if the melting point is less than 110° C., the resin is softened, deformed or partially or entirely melted when the resin is added and kneaded into the rubber component on compounding. Thus, since the desired average particle diameter cannot be maintained, improved tire performances on ice and snow as aimed at by the present invention disappear.

Further, it is undesirable that (X+10Y) is smaller than 250, because desired hardness of the resin-composite particulates cannot be obtained, so that intended performances on ice and snow cannot be obtained. On the other hand, it is undesirable that (X+10Y) is greater than 1300, because processability is conspicuously deteriorated during the production of the resin-composite particulates.

Furthermore, the average particle diameter of the particulates of the syndiotactic-1,2-polybutadiene resin used in the present invention need to be in a range of 10 to 500 µm. The reason is that if the average particle diameter is less than 10 µm, tire performances on ice and roads as aimed at by the present invention are not sufficient. On the other hand, if the average particle diameter is more than 500 µm, although some effects are recognized with respect to the tire performances on ice and snow, it is undesirable because other performances such as wear resistance also required for the tire are deteriorated.

Further, it is necessary that 5 to 60 parts by weight of the composite particulates of the above syndiotactic-1,2-polybutadiene resin is incorporated in the rubber composition for the tread of the pneumatic tire of the present invention relative to 100 parts by weight of the rubber component. The reason is that if the compounding ratio is less than 5 parts by weight, improved performances on ice and snow as desired can almost hardly be attained, whereas if more than 60 parts by weight of the resin is incorporated relative to 100 parts of the rubber component, other tire performances such as wear resistance are not only deteriorated, but also processability during the production of the tire is largely deteriorated, thereby rendering the pneumatic tire actually impractical.

The composite particulates of the syndiotactic-1,2-polybutadiene resin satisfying the above-mentioned requirements to be used in the present invention can be produced by the following method by way of example.

Dewatered benzene, 760 cc, is charged into a 2-liter autoclave in which air is replaced by nitrogen gas, and 74 g of 1,3-butadiene is dissolved into benzene. To the solution is added 1 m mol cobalt octoate (a benzene solution containing 1 mmol/ml of cobalt octoate), and 1 minute thereafter 2 mmol triethyl aluminum (benzene solution containing 2 m mol/ml triethyl aluminum) is added and stirred. One minute later, acetone is added in an appropriate amount to attain a desired melting point. Further, one minute later, carbon dioxide, 0.6 mmol (benzene solution containing 0.3 mmol/ ml) is added into the mixture, which is stirred at 10° C. for 60 minutes to effect polymerization of 1,3-butadiene.

2,4-Ditertial-butyl-p-cresol, 0.75 g. is added to the syndiotactic-1,2-polybutadiene resin-produced liquid. Then, the resulting liquid is added into 1,000 ml of methanol, thereby precipitating a syndiotactic-1,2-polybutadiene resin.

The thus obtained syndiotactic-1,2-polybutadiene resin is further washed with methanol, and methanol is filtered off, followed by vacuum drying.

250 ml Given carbon black was added to the thus obtained resin, which is kneaded for three minutes at a temperature higher than a melting point of the resin by using a laboratory plastomill.

Composite particulates of the syndiotactic-1,2-polybutadiene resin having a given average particle diameter are obtained from the thus produced syndiotactic-1,2-polybutadiene resin-composite material by an ordinary method.

The method for producing the resin-composite particulates to be used in the present invention is not limited to the above-mentioned one, and any other appropriate producing method may be employed.

In the second aspect of the tire portion of the present invention, it is unnecessary to limit the kind of the rubber constituting the rubber composition in which the composite particulates of the syndiotactic-1,2-polybutadiene resin are incorporated as well as the kinds of a filler and other chemical to any specific ones, and ordinarily used rubber, filler, chemical, etc. may be employed.

For example, as the rubber component, natural rubber, polyisoprene rubber, polybutadiene rubber, styrene-butadiene copolymer rubber, styrene-isoprene-butadiene terpolymer rubber, styrene-isoprene copolymer rubber, and isoprene-butadiene copolymer rubber may be recited. The rubber composition used in the tread may include a filler, an antioxidant, a vulcanizator, a vulcanization accelerator, etc. The kinds and the amounts of these additives may be selected among the ordinary ranges, and are not limited to any specific ones.

According to the second aspect of the tire portion of the present invention, it is preferable that the tread rubber has closed cells at a foaming rate of 3 to 35 %. Such closed cells are effective in exhibiting excellent performances on ice and snow through increasing microscopic water absorption-drainage effect due to the cells in a state that ice is abundant with water melted on its surface near 0° C.

The foaming may be effected either by using a foaming agent or by mixing with a gas under high pressure. If the foaming rate is less than 3%, the foaming effect cannot be sufficiently exhibited. On the other hand, the foaming rate is unfavorably more than 35%, because the rigidity of the tread becomes insufficient, so that wear resistance lowers and occurrence of cracks on bottoms of grooves becomes greater.

As mentioned above, the foamed rate of the foamed rubber is expressed by the following formula: $Vs=\{(\rho_0-\rho_1)/(\rho_1-\rho_9)-1\}\times 100(\%)$, which may be approximated to $Vs=\{(\rho_0-\rho_1)-1\}100(\%)$. When the foamed rubber is employed as the matrix, the resin-composite particulates are dispersed in the foamed rubber.

In the pneumatic tire according to the second aspect of the tire portion of the present invention, the rubber composition including the above-mentioned syndiotactic-1,2-polybutadiene resin and composed of the non-foamed or foamed rubber as the matrix may be arranged in the entirety of the tread rubber or in only a cap portion of the tread having a cap-base construction.

The rubber composition portion of the present invention will be explained in more detail with reference to examples and comparative examples. The examples should not be construed as limiting the present invention in any way.

First, methods for measuring various physical properties of the examples and comparative examples will be explained.

(1) Melting Point of Syndiotactic-1,2-polybutadiene resin:

The resin was heated at a heating rate of 10° C./min in a temperature range from 30° C. to 250° C., and an endothermic peak was obtained by using a differential thermal analyzer DSC 200 manufactured by SEIKO ELECTRONICS CO., LTD. The melting point of the resin was determined based on the thus obtained endothermic peak.

(2) Slip Friction Resistance:

1) Dry Skid Resistance

Tan δ of a vulcanized rubber composition was measured at 30° C. and a frequency of 10 Hz by using a spectrometer manufactured by IWAMOTO SEISAKUSHO CO., LTD. Results are indicated by index. The greater the index, the better is the dry skid resistance.

2) Wet Skid Resistance

Skid resistance on wet road (wet skid resistance) of the rubber composition was measured at room temperature by using a skid resistance meter manufactured by STANLEY CO., LTD. Results are indicated by index. The greater the index, the better is the wet skid resistance.

3) Ice Skid Resistance

The coefficient of friction on ice of the rubber composition, particularly the coefficient of friction on ice near 0° C. in a wet state, was measured with use of a dynamic-static friction coefficient meter manufactured by KYOWA KAIMEN KAGAKU, CO., LTD. by contacting a surface of a sample (sample dimensions: 10 mm long, 10 mm wide and 5 mm thick) obtained from a slab sheet produced by ordinary vulcanization with ice having a surface temperature of −0.5° C.

The measuring conditions were a load of 5 kgf/cm$^2$, a sliding speed of 10 mm/sec, a surrounding temperature of −2° C., and the ice surface state being substantially a mirror.

(3) Fracture Resistance:

Fracture resistance of the rubber composition was measured according to JIS K 6301, and results are indicated as tensile strength by index. The greater the index, the better is the fracture resistance.

(4) Wear Resistance:

Wear resistance of the rubber composition was measured by a Lambourn abrasion tester manufactured by IWAMOTO SEISAKUSHO CO., LTD. Results are indicated by index. The greater the index, the better is the wear resistance.

(5) Specific Gravity:

The specific gravity of the rubber composition was measured by using an automatic densitometer (AUTOMATIC DENSIMETER) manufactured by TOYO SEIKI CO., LTD.

Next, the process for producing the syndiotactic-1,2-polybutadiene resin used in the present Examples will be explained.

Dewatered benzene, 760 cc, was charged into a 2-liter autoclave in which air was replaced by nitrogen gas, and 74 g of 1,3-butadiene was dissolved into benzene. To the solution was added 1 mmol cobalt octoate (a benzene solution containing 1 mmol/cc of cobalt octoate), and 1 minute thereafter 2 mmol triethyl aluminum (benzene solution containing 1 m mol/cc triethyl aluminum) was added and stirred. One minute later, acetone was added in an amount shown in Table 1. Further, one minute later, carbon disulfide, 0.6 mmol (benzene solution containing 0.3 mmol/cc) was added into the mixture, which was stirred at 10° C. for 60 minutes to effect polymerization of 1,3-butadiene.

2,4-Ditertial-butyl-p-cresol, 0.75 g, was added to the syndiotactic-1,2-polybutadiene resin-produced liquid. Then, the resulting liquid was added into 1,000 cc of methanol, thereby precipitating syndiotactic-1,2-polybutadiene resin.

The thus obtained syndiotactic-1,2-polybutadiene resin was further washed with methanol, and methanol was filtered off, followed by vacuum drying.

TABLE 1

| Kind of resin | A | B | C | D | E | F |
|---|---|---|---|---|---|---|
| Addition amount of acetone (m mol) | 2200 | 1100 | 290 | 5 | 7000 | 3700 |
| Melting point (°C.) | 121 | 140 | 170 | 194 | 87 | 106 |

Next, occurrence of the co-crosslinked structure between the thus produced syndiotactic-1,2-polybutadiene resin and rubber was judged by the following method.

As shown in FIG. 1, an about 1 mm thick sheet of the syndiotactic-1,2-polybutadiene resin or nylon-6 and an about 1 mm thick unvulcanized rubber sheet obtained by kneading a rubber composition having a compounding recipe shown in Table 2 (parts by weight) were attached together through a cellophane film 2 at opposite end portions thereof, and the obtained thick sheet having a total thickness of 2 mm was subjected to vulcanization under given vulcanization conditions in a press mold.

Then, the vulcanized sheet was cut in a width of 1 cm, and subjected to a peeling test at a peeling speed of 20 mm/min as shown in FIG. 1. Results in the peeling test were judged in the following criterion.

| | |
|---|---|
| Not co-crosslinked | No rubber 3 was attached to the resin 1 in FIG. 1 (interface peeling). |
| Co-crosslinked | Rubber 3 was clearly attached to the resin 1 (cohesion peeling). |

Results are shown in Table 3.

TABLE 2

| | Parts by weight |
|---|---|
| Natural rubber | 100 |
| Carbon black N339 | 45 |
| Stearic acid | 1.0 |
| Zinc oxide | 2.0 |
| Antioxidant | 1.0 |
| Vulcanization accelerator | 1.0 |
| Sulfur | 1.5 |

TABLE 3

| Resin (melting point of crystal °C.) | Syndiotactic-1,2-polybutadiene resin | | | Nylon-6 |
|---|---|---|---|---|
| | (130) | (140) | (160) | |
| Attachment of rubber to resin | attached | attached | attached | not attached |

(Note) Vulcanizating conditions: 145° C., 30 min.

As is seen from Table 3, it is clear that when the syndiotactic-1,2-polybutadiene resin was incorporated into the rubber composition as the particulate material and the composition was vulcanized by the ordinary method, the co-crosslinked structure was formed at the interface between the rubber component as the matrix and the particulate material. Therefore, as compared with the particulate nylon-6 material having formed no co-crosslinked structure, it is understood that the syndiotactic-1,2-polybutadiene resin improves fracture strength. It can be expected that the following wear resistance is also enhanced by the improvement on the fracture strength.

EXAMPLES 1–4 AND COMPARATIVE EXAMPLES 1–3

The average particle diameter of each of the syndiotactic-1,2-polybutadiene resins, A, B, C, D, E and F shown in Table 1 was adjusted to 150 μm by an ordinary method. The average particle diameter was measured by an air jet sieve grain size 200 LS type meter manufactured by ALPINE CO., LTD. The obtained syndiotactic-1,2-polybutadiene resin was compounded according to a compounding recipe (parts by weight) shown in Table 4 to obtain a vulcanizate. Physical properties of the vulcanizate are also shown in Table 4.

TABLE 4

| | | Comparative Example 1 | Example 1 | Example 2 | Example 3 | Example 4 | Comparative Example 2 | Comparative Example 3 |
|---|---|---|---|---|---|---|---|---|
| Natural rubber | | 50 | 50 | 50 | 50 | 50 | 50 | 50 |
| Butadiene rubber | | 50 | 50 | 50 | 50 | 50 | 50 | 50 |
| Carbon black N339 | | 50 | 50 | 50 | 50 | 50 | 50 | 50 |
| Process oil | | 5 | 5 | 5 | 5 | 5 | 5 | 5 |
| Stearic acid | | 1.0 | 1.0 | 1.0 | 1.0 | 1.0 | 1.0 | 1.0 |
| ZnO | | 3.0 | 3.0 | 3.0 | 3.0 | 3.0 | 3.0 | 3.0 |
| Antioxidant | | 1.0 | 1.0 | 1.0 | 1.0 | 1.0 | 1.0 | 1.0 |
| Vulcanization accelerator | | 1.5 | 1.5 | 1.5 | 1.5 | 1.5 | 1.5 | 1.5 |
| Sulfur | | 1.5 | 1.5 | 1.5 | 1.5 | 1.5 | 1.5 | 1.5 |
| Syndiotactic-1,2- | A | — | 20 | — | — | — | — | — |
| polybutadiene resin | B | — | — | 20 | — | — | — | — |

TABLE 4-continued

|  |  | Comparative Example 1 | Example 1 | Example 2 | Example 3 | Example 4 | Comparative Example 2 | Comparative Example 3 |
|---|---|---|---|---|---|---|---|---|
|  | C | — | — | — | 20 | — | — | — |
|  | D | — | — | — | — | 20 | — | — |
|  | E | — | — | — | — | — | 20 | — |
|  | F | — | — | — | — | — | — | 20 |
| Dry skid resistance | | 100 | 100 | 101 | 102 | 100 | 105 | 102 |
| Wet skid resistance | | 100 | 101 | 105 | 108 | 100 | 95 | 98 |
| Ice skid resistance | | 100 | 170 | 190 | 221 | 253 | 98 | 101 |
| Tensile strength (Index) | | 100 | 107 | 101 | 95 | 89 | 99 | 105 |
| Wear resistance (Index) | | 100 | 121 | 118 | 101 | 98 | 103 | 99 |
| Specific gravity | | 1.11 | 1.08 | 1.06 | 1.07 | 1.07 | 1.07 | 1.08 |

EXAMPLES 5–8 AND COMPARATIVE EXAMPLES 4–6

The average particle diameter of the syndiotactic-1,2-polybutadiene resin B shown in Table 1 was adjusted to a value shown in Table 5 by controlling a milling time in the ordinary method.

TABLE 5

|  | B-1 | B-2 | B-3 | B-4 | B-5 | B-6 |
|---|---|---|---|---|---|---|
| Average particle diameter ($\mu$m) | 0.5 | 10 | 148 | 243 | 460 | 530 |

Each of the syndiotactic-1,2-polybutadiene resins shown in Table 5 was compounded according to a compounding recipe shown in Table 6 (parts by weight) to obtain a vulcanizate. Physical properties of the resulting vulcanizate are also shown in Table 6.

EXAMPLES 9–11 AND COMPARATIVE EXAMPLES 7–9

The syndiotactic-1,2-polybutadiene resin (B-3) shown in Table 5 was used, and compounded according to a compounding recipe shown in Table 7 (parts by weight) to obtain a vulcanizate. Physical properties of the resulting vulcanizate are also shown in Table 7.

TABLE 6

|  |  | Comparative Example 4 | Comparative Example 5 | Example 5 | Example 6 | Example 7 | Example 8 | Comparative Example 6 |
|---|---|---|---|---|---|---|---|---|
| Natural rubber | | 100 | 100 | 100 | 100 | 100 | 100 | 100 |
| Carbon black N110 | | 45 | 45 | 45 | 45 | 45 | 45 | 45 |
| Process oil | | 5 | 5 | 5 | 5 | 5 | 5 | 5 |
| Stearic acid | | 2 | 2 | 2 | 2 | 2 | 2 | 2 |
| ZnO | | 3 | 3 | 3 | 3 | 3 | 3 | 3 |
| Antioxidant | | 1.5 | 1.5 | 1.5 | 1.5 | 1.5 | 1.5 | 1.5 |
| Vulcanization accelerator | | 1.0 | 1.0 | 1.0 | 1.0 | 1.0 | 1.0 | 1.0 |
| Sulfur | | 1.5 | 1.5 | 1.5 | 1.5 | 1.5 | 1.5 | 1.5 |
| Syndiotactic-1,2-polybutadiene resin | B-1 | — | 20 | — | — | — | — | — |
|  | B-2 | — | — | 20 | — | — | — | — |
|  | B-3 | — | — | — | 20 | — | — | — |
|  | B-4 | — | — | — | — | 20 | — | — |
|  | B-5 | — | — | — | — | — | 20 | — |
|  | B-6 | — | — | — | — | — | — | 20 |
| Dry skid resistance | | 100 | 101 | 98 | 102 | 100 | 99 | 96 |
| Wet skid resistance | | 100 | 98 | 101 | 104 | 103 | 107 | 110 |
| Ice skid resistance | | 100 | 95 | 105 | 247 | 181 | 155 | 123 |
| Tensile strength (Index) | | 100 | 110 | 103 | 97 | 98 | 91 | 78 |
| Wear resistance (Index) | | 100 | 104 | 103 | 100 | 98 | 96 | 85 |

TABLE 7

|  | Comparative Example 7 | Comparative Example 8 | Example 9 | Example 10 | Example 11 | Comparative Example 9 |
|---|---|---|---|---|---|---|
| Natural rubber | 70 | 70 | 70 | 70 | 70 | 70 |
| Butadiene rubber | 30 | 30 | 30 | 30 | 30 | 30 |
| Carbon black N220 | 55 | 55 | 55 | 55 | 55 | 55 |
| Process oil | 7 | 7 | 7 | 7 | 7 | 7 |
| Stearic acid | 2 | 2 | 2 | 2 | 2 | 2 |
| ZnO | 3 | 3 | 3 | 3 | 3 | 3 |
| Antioxidant | 1.5 | 1.5 | 1.5 | 1.5 | 1.5 | 1.5 |
| Vulcanization accelerator | 1.5 | 1.5 | 1.5 | 1.5 | 1.5 | 1.5 |
| Sulfur | 1.5 | 1.5 | 1.5 | 1.5 | 1.5 | 1.5 |
| Syndiotactic-1,2-polybutadiene resin B-3 | — | 3 | 10 | 30 | 50 | 90 |
| Dry skid resistance | 100 | 95 | 98 | 102 | 100 | 90 |
| Wet skid resistance | 100 | 90 | 104 | 105 | 108 | 98 |
| Ice skid resistance | 100 | 97 | 115 | 263 | 173 | 109 |
| Tensile strength (index) | 100 | 103 | 105 | 99 | 95 | 76 |
| Specific gravity | 1.12 | 1.11 | 1.09 | 1.06 | 1.06 | 1.03 |
| Kneadability *) | ◯ | ◯ | ◯ | ◯ | ◯ | x |

Note: Evaluation standard for kneadability is as follows:
◯ . . . Kneaded mixture could take an integral sheet-like form on a roll, and could be post-processed.
x . . . Kneaded mixture could not take an integral form on the roll, and could not be post-processed.

COMPARATIVE EXAMPLES 1A–2A AND EXAMPLES 3A–6A

Comparison data are given below with respect to vulcanized sheets using syndiotactic-1,2-polybutadiene resins having reduced viscosities ($\eta_{sp}/c$) given in Table 8 and obtained by the method described above in the specification. Dry skid resistance, wet skid resistance, ice skid resistance, tensile strength, wear resistance and specific gravity were evaluated or measured in the same way as set forth above in the specification.

TABLE 8

Relation between $\eta_{sp}/c$ and physical properties

|  | Comparative Example | | Example | | | |
|---|---|---|---|---|---|---|
| Run No. | 1A | 2A | 3A | 4A | 5A | 6A |
| $\eta_{sp}/c$ | 0.59 | 0.62 | 0.75 | 1.00 | 2.20 | 3.76 |
| Melting point (°C.) | 143 | 142 | 139 | 140 | 143 | 144 |
| M value | 2 | 2 | 2 | 3 | 3 | 3 |
| Dry skid resistance | 97 | 98 | 100 | 101 | 101 | 100 |
| Wet skid resistance | 97 | 99 | 103 | 104 | 105 | 104 |
| Ice skid resistance | 99 | 101 | 140 | 145 | 190 | 205 |
| Tensile strength | 93 | 94 | 103 | 102 | 101 | 100 |
| Wear resistance | 93 | 97 | 117 | 119 | 118 | 109 |
| Specific gravity | 1.05 | 1.06 | 1.06 | 1.05 | 1.06 | 1.05 |

As is seen from Table 8, if the reduced viscosity ($\eta_{sp}/c$) of the syndiotactic-1,2-polybutadiene resin is less than 0.70, skid resistance is insufficient.

Comparative Experimentation Regarding Melting Point in Relation to Kneading (Mixing) Temperature and Vulcanizing Temperature With respect to U.S. Pat. No. 4,790,365 to Sandstrom et al, it is noted that the SPBD powder is mixed into the compound utilizing standard mixing procedures at a temperature which is at least as high as the melting point of the SPBD being used (see column 4, lines 10–14 and claim 13). In such a case, the SPBD powder is melted, so that its particular shape is lost. Consequently, total skid resistance becomes poorer.

The above phenomenon is demonstrated in the following data with respect to vulcanized sheets obtained in the same manner as set forth above in the specification. The kneading (mixing) temperature and vulcanizing temperature were set as shown in Table 9.

The compounding recipe (parts by weight) of each of the vulcanized sheets is as follows:

Natural rubber: 50

Butadiene rubber: 50

Carbon black N339: 50

Process oil: 5

Stearic acid: 1.0 is ZnO: 3.0

Antioxidant: 1.0

Vulcanization Accelerator: 1.5

Sulfur: 1.5

Syndiotactic-1,2-polybutadiene resin: 20

Dry skid resistance, wet skid resistance, ice skid resistance, tensile strength, wear resistance and specific gravity were evaluated or measured in the same way as set forth above.

TABLE 9

| Run No. | 7A | 8A | 9A | 10A | 11A | 12A | 13A | 14A | 15A |
|---|---|---|---|---|---|---|---|---|---|
| Melting point of resin | | 121° C. | | | 140° C. | | | 170° C. | |
| Kneading temp. (°C.) | 160 | 103 | 102 | 160 | 102 | 101 | 185 | 104 | 105 |

TABLE 9-continued

| Run No. | 7A | 8A | 9A | 10A | 11A | 12A | 13A | 14A | 15A |
|---|---|---|---|---|---|---|---|---|---|
| Vulcanizing temp. (°C.) | 145 | 145 | 110 | 145 | 145 | 135 | 145 | 190 | 145 |
| $\eta_{sp}/c$ | 1.00 | 1.00 | 1.00 | 1.00 | 1.00 | 1.00 | 1.10 | 1.10 | 1.10 |
| M value | 3 | 3 | 3 | 3 | 3 | 3 | 2 | 2 | 2 |
| Dry skid resistance | 101 | 102 | 100 | 102 | 103 | 101 | 101 | 100 | 102 |
| Wet skid resistance | 98 | 99 | 101 | 99 | 99 | 105 | 99 | 100 | 108 |
| Ice skid resistance | 104 | 105 | 170 | 107 | 106 | 190 | 108 | 108 | 221 |
| Tensile strength | 99 | 100 | 107 | 98 | 99 | 101 | 97 | 96 | 95 |
| Wear resistance | 111 | 109 | 121 | 108 | 107 | 118 | 99 | 100 | 101 |
| Specific gravity | 1.08 | 1.08 | 1.08 | 1.06 | 1.06 | 1.06 | 1.07 | 1.07 | 1.07 |

As compared with the cases where the melting point of the syndiotactic-1,2-polybutadiene resin is lower than at least one of the kneading temperature and the vulcanizing temperature, the cases where the melting point is not higher than the kneading temperature and the vulcanizing temperature exhibit superior ice skid resistance.

As is clear from the above-mentioned test results, according to the rubber composition of the present invention, the particulates of the syndiotactic-1,2-polybutadiene resin having the average particle diameter and the melting point as specified above is incorporated into the rubber composition at the specified compounding ratio. Thus, conspicuous improvement on the slip friction resistance can be recognized without losing fracture resistance and wear resistance. Further, since the rubber composition according to the present invention has a small specific gravity, the above effects are extremely great.

The tire portion of the present invention will now be explained in more detail with reference to examples and comparative examples. Again, the examples should not be construed as limiting the present invention in any way.

First, methods for measuring various physical properties of the examples and comparative examples will be explained.

1. Melting Point of Crystalline Syndiotactic-1,2-polybutadiene resin:

The resin was heated at a heating rate of 10° C. min in a temperature range from 30° C. to 250° C., and an endothermic peak was obtained by using a differential thermal analyzer DSC 200 manufactured by SEIKO ELECTRONICS CO., LTD. The melting point of the resin was determined based on the thus obtained endothermic peak.

2. Measurement of Nitrogen-adsorption Specific Surface Area of Carbon Black:

Nitrogen-adsorption specific surface area of carbon black was measured according to ASTM D3037-84.

3. Testing of Physical Properties of Tread Rubber:

(1) Measurement of Coefficient of Friction on Ice

The coefficient of friction on ice of the rubber composition, particularly the coefficient of friction on ice near 0° C. in a wet state, was measured with use of a dynamic-static friction coefficient meter manufactured by KYOWA KAIMEN KAGAKU, CO., LTD. by contacting a surface of a sample (sample dimensions: 10 mm long, 10 mm wide and 5 mm thick) obtained from a slab sheet produced by ordinary vulcanization with ice having a surface temperature of −0.5° C.

The measuring conditions were a load of 2 kgf/cm² and 5 kgf/cm² for a passenger car radial tire (small size tire) and a truck-bus radial tire (large size tire), respectively, a sliding speed of 10 mm/sec, a surrounding temperature of −2° C., and the ice surface state being substantially a mirror.

(2) Tests for Performances of Small Size Tires

Each small size tire PSR (165SR13) was prepared, subjected to ordinary running as idling over 50km, and tested to check each test item. Similar small tires were used in the following brakability test, wear resistance test and wet skid resistance test.

a) Brakability on Ice:

Four tires to be tested were fitted to a vehicle having a displacement of 1500 cc, and a braked distance was measured on ice at an open temperature of −5° C.

In the following Experiment 1, test results are indicated by index, taking that of Comparative Example 1—1 as control tire as 100.

In the following Experiment 3, test results are indicated by index, taking that of Comparative Example 2-7 as control tire as 100.

The greater the value, the more excellent is the brakability on ice.

b) Wear Resistance:

Two tires to be tested were fitted to a driving shaft of a passenger vehicle having a displacement of 1500 cc, and run on a concrete road in a test course at a given speed. Change in depth of a groove was measured. In Experiment 1, test results are indicated by index taking that of Comparative Example 1—1 as control tire as 100. In Experiment 3, test results are indicated by index, taking that of Comparative Example 2-7 as control tire as 100. The greater the value, the more excellent is the wear resistance.

c) Wet Skid Resistance:

Four tires to be tested were fitted to a vehicle having a displacement of 1500 cc, and rapidly braked from 80 km/h on a wet concrete road having water at a depth of 3 mm, and a distance required until the vehicle stopped after the tires were locked was measured. Skid resistance on wet road (wet skid resistance) of the tested tires was evaluated based on the following equation:

In Experiment 1, $$\text{Wet skid resitance} = \frac{\text{Stopped distance of Comparative tire 1-1 as control tire}}{\text{Stopped distance of Test tire}} \times 100$$

In Experiment 3, $$\text{Wet skid resitance} = \frac{\text{Stopped distance of Comparative tire 2-7 as control tire}}{\text{Stopped distance of test tire}} \times 100$$

The greater the value, the wet skid resistance is the more excellent.

(3) Tests for Performances of Large Size Tires:

Each large size tire TBR (1000R20) was prepared. Tires were fitted to a driving shaft of a 8-ton 2D type truck under a 100% loaded condition, subjected to ordinary running as idling over 150 km, and tested to check each test item.

a) Brakability on Ice:

Four tires to be tested were fitted to all wheels of a 8-ton 2D-type truck under a 100% loaded condition, the tires were subjected to full lock braking from 20 km/h, and a braked distance at which the vehicle was stopped was measured. The temperature of ice was −5° C.

In the following Experiment 2, test results are indicated by index, taking that of Comparative Example 1-7 as control tire as 100.

In the following Experiment 4, a 6-ton 2D-type truck was used instead of the 8-ton 2D-type truck in Experiment 2. Test results are indicated by index, taking that of Comparative Example 2-8 as control tire as 100.

The greater the value, the more excellent is the brakability on ice.

b) Wear Resistance:

Tires were fitted to entire wheels of the 8-ton 2D-type truck under a 100% loaded conditions, and actually run under ordinary conditions. Change in depth of a groove after 50,000 km running was measured. In Experiment 2, test results are indicated by index taking that of Comparative Example 1-7 as control tire as 100. In Experiment 4, test results are indicated by index, taking that of Comparative Example 2-8 as control tire as 100. The greater the value, the more excellent is the wear resistance.

In the following Table 10, the average particle diameters and the melting points of the crystalline syndiotactic-1,2-polybutadiene resins used in examples and comparative examples are shown.

The average particle diameter was measured by using an air jet sieve grain size meter, 200LS type manufactured by ALPINE Co., Ltd. 50% Accumulated particle diameter was taken as the average particle diameter.

TABLE 10

| Kind of resin | A | B | C | D | E | F | G | H |
|---|---|---|---|---|---|---|---|---|
| Average particle diameter (μm) | 2.5 | 18 | 80 | 120 | 310 | 570 | 120 | 120 |
| Melting point of crystalline resin (°C.) | 140 | 121 | 194 | 139 | 170 | 137 | 87 | 106 |

Experiments 1 and 2

Each of Tables 11 and 12 shows a compounding recipe of various particulate syndiotactic-1,2-polybutadiene resins shown in Table 10 and rubber matrixes combined (parts by weight) as well as physical properties of vulcanizates of these particulate-containing rubbers and performances of tires in which each of the thus obtained particulate-mixed rubbers was employed in a tread of the tire. More particularly, Table 11 shows results of passenger radial tires (PSR) [Experiment 1], and Table 12 shows those of truck-bus radial tires (TBR) [Experiment 2].

TABLE 11

|  |  | Comparative Example 1-1 | Comparative Example 1-2 | Example 1-1 | Example 1-2 | Example 1-3 | Example 1-4 |
|---|---|---|---|---|---|---|---|
| Compounding-recipe | natural rubber | 60 | 60 | 60 | 60 | 60 | 60 |
|  | butadiene rubber | 40 | 40 | 40 | 40 | 40 | 40 |
|  | carbon black N220 | 60 | 60 | 60 | 60 | 60 | 60 |
|  | process oil | 5 | 5 | 5 | 5 | 5 | 5 |
|  | stearic acid | 1.5 | 1.5 | 1.5 | 1.5 | 1.5 | 1.5 |
|  | zinc oxide | 3.0 | 3.0 | 3.0 | 3.0 | 3.0 | 3.0 |
|  | antioxidant | 1.0 | 1.0 | 1.0 | 1.0 | 1.0 | 1.0 |
|  | vulcanization accelerator | 1.5 | 1.5 | 1.5 | 1.5 | 1.5 | 1.5 |
|  | sulfur | 1.8 | 1.8 | 1.8 | 1.8 | 1.8 | 1.8 |
|  | foaming agent (ADCA) | — | — | — | — | — | — |
|  | urea | — | — | — | — | — | — |
| Kind of resin | A | — | 20 | — | — | — | — |
|  | B | — | — | 20 | — | — | — |
|  | C | — | — | — | 20 | — | — |
|  | D | — | — | — | — | 20 | — |
|  | E | — | — | — | — | — | 20 |
|  | F | — | — | — | — | — | — |
|  | G | — | — | — | — | — | — |
|  | H | — | — | — | — | — | — |
| Foaming rate (%) |  | — | — | — | — | — | — |
| Coefficient of friction on ice | × 10⁻³ | 6.2 | 19 | 29 | 39 | 45 | 47 |
| Tire performance | wet skid resistance | 100 | 101 | 103 | 101 | 98 | 97 |
|  | brakability on ice | 100 | 98 | 107 | 109 | 121 | 115 |
|  | wear resistance | 100 | 109 | 106 | 95 | 102 | 99 |

TABLE 11-continued

|  |  | Comparative Example 1-3 | Comparative Example 1-4 | Comparative Example 1-5 | Comparative Example 1-6 | Example 1-5 | Example 1-6 |
|---|---|---|---|---|---|---|---|
| Compounding-recipe | natural rubber | 60 | 60 | 60 | 60 | 60 | 60 |
|  | butadiene rubber | 40 | 40 | 40 | 40 | 40 | 40 |
|  | carbon black N220 | 60 | 60 | 60 | 60 | 60 | 60 |
|  | process oil | 5 | 5 | 5 | 5 | 5 | — |
|  | stearic acid | 1.5 | 1.5 | 1.5 | 1.5 | 1.5 | 1.5 |
|  | zinc oxide | 3.0 | 3.0 | 3.0 | 3.0 | 3.0 | 3.0 |
|  | antioxidant | 1.0 | 1.0 | 1.0 | 1.0 | 1.0 | 1.0 |
|  | vulcanization accelerator | 1.5 | 1.5 | 1.5 | 1.5 | 1.5 | 1.5 |
|  | sulfur | 1.8 | 1.8 | 1.8 | 1.8 | 1.8 | 1.8 |
|  | foaming agent (ADCA) | — | — | — | 3.0 | 3.0 | 3.0 |
|  | urea | — | — | — | 2.8 | 2.8 | 2.8 |
|  | Kind of resin A | — | — | — | — | — | — |
|  | B | — | — | — | — | — | — |
|  | C | — | — | — | — | — | — |
|  | D | — | — | — | — | 10 | 20 |
|  | E | — | — | — | — | — | — |
|  | F | 20 | — | — | — | — | — |
|  | G | — | 20 | — | — | — | — |
|  | H | — | — | 20 | — | — | — |
| Foaming rate (%) |  | — | — | — | 17 | 14 | 16 |
| Coefficient of friction on ice | $\times 10^{-3}$ | 28 | 16 | 19 | 35 | 46 | 51 |
| Tire performance | wet skid resistance | 95 | 91 | 88 | 104 | 101 | 98 |
|  | brakability on ice | 102 | 95 | 100 | 112 | 118 | 124 |
|  | wear resistance | 79 | 91 | 89 | 88 | 97 | 95 |

TABLE 12

|  |  | Comparative Example 1-7 | Comparative Example 1-8 | Example 1-7 | Example 1-8 | Example 1-9 | Example 01-1 | Comparative Example 1-9 | Comparative Example 1-10 | Comparative Example 1-11 | Example 1-11 | Comparative Example 1-12 |
|---|---|---|---|---|---|---|---|---|---|---|---|---|
| Compounding recipe | butadiene rubber | — | — | — | — | — | — | — | — | 30 | 30 | 30 |
|  | natural rubber | 100 | 100 | 100 | 100 | 100 | 100 | 100 | 100 | 70 | 70 | 70 |
|  | carbon black N110 | 45 | 45 | 45 | 45 | 45 | 45 | 45 | 45 | 55 | 55 | 55 |
|  | process oil | 10 | 10 | 10 | 10 | 10 | 10 | 10 | 10 | 3 | 3 | 3 |
|  | stearic acid | 2 | 2 | 2 | 2 | 2 | 2 | 2 | 2 | 4 | 4 | 4 |
|  | zinc oxide | 2.5 | 2.5 | 2.5 | 2.5 | 2.5 | 2.5 | 2.5 | 2.5 | 3 | 3 | 3 |
|  | antioxidant | 1 | 1 | 1 | 1 | 1 | 1 | 1 | 1 | 1 | 1 | 1 |
|  | vulcanization accelerator | 1 | 1 | 1 | 1 | 1 | 1 | 1 | 1 | 2 | 2 | 2 |
|  | sulfur | 1.5 | 1.5 | 1.5 | 1.5 | 1.5 | 1.5 | 1.5 | 1.5 | 1.5 | 1.5 | 1.5 |
|  | foaming agent (OBSH) Note 1 | — | — | — | — | — | — | — | — | 4.0 | 4.0 | 4.0 |
|  | amount of resin D | — | 3 | 10 | 20 | 30 | 50 | 70 | 100 | 3 | 30 | 70 |
| Foaming rate (%) |  | — | — | — | — | — | — | — | — | 14 | 16 | 19 |
| Coefficient of friction on ice | $\times 10^{-2}$ | 23 | 22 | 32 | 48 | 53 | 45 | 37 | 30 | 43 | 50 | 39 |
| Tire performance | brakability on ice | 100 | 97 | 108 | 113 | 119 | 115 | 104 | * | 112 | 122 | * |
|  | wear resistance | 100 | 106 | 101 | 102 | 98 | 97 | 86 | * | 93 | 92 | * |

Note 1: p,p'-oxybis(benzylsulfonylhydrazide)

Table 11 shows test results in the performance-evaluating tests for the passenger car radial tires, and the following is confirmed from this Table 11.

That is, in Examples 1-1 to 1-4, the syndiotactic-1,2-polybutadiene resin B, C, D or E satisfying the requirements of the present invention with respect to the average particle diameter and the melting point of the crystalline resin was incorporated in an amount of 20 parts by weight. In Comparative Examples 1-2 to 1-5, the resin A, F, G or H not satisfying such requirements was incorporated. As compared with Comparative Examples 1-2 to 1-5, it is seen from Table 11 that Examples 1—1 to 1-4 had largely improved brakability on ice, while almost not deteriorating wet skid resistance or wear resistance. (The results are compared through Comparative Example 1—1 as control tire).

In Examples 1-5 and 1-6, the syndiotactic-1,2-polybutadiene resin D satisfying the above requirements of the present invention was compounded into the tread rubber, and a foamed rubber was used as the matrix rubber. In Examples 1-5 and 1-6, the brakability on ice could be further improved without almost deteriorating other tire performances. In Comparative Example 1-6, no such a resin was compounded, but a foamed rubber was used alone. In Comparative Example 1-6, the brakability on ice was improved, but wear resistance was not satisfactory.

Next, Table 12 shows test results in the performance-evaluating tests for the truck-bus radial tires, and the following is confirmed from this Table 12.

In Examples 1-7 to 1-10, the syndiotactic-1,2-polybutadiene resin D satisfying the requirements of the present invention was incorporated into a tread rubber in a compounding recipe specified in the present invention. In Comparative Examples 1-8 to 1-10, the compounding ratio of the resin D fell outside the range in the present invention. As compared with Comparative Examples 1-8 to 1-10, the brakability on ice was largely improved in Examples 1-7 to 1-10, while wear resistance is not almost lost. (The results are compared through Comparative Example 1-7 as control tire).

In Example 1-11, the syndiotactic-1,2-polybutadine resin D satisfying the requirements of the present invention was incorporated into a tread rubber in a compounding recipe specified in the invention, and a foamed rubber was used as the matrix rubber. In Example 1-11, brakability on ice could be further improved, while not almost deteriorating other tire performances. In Comparative Examples 1-11 and 1-12, the resin was incorporated in an amount falling outside the compounding recipe specified in the present invention, although a foamed rubber was used. In Comparative Examples 1-11 and 1-12, brakability on ice was improved, but satisfactory wear resistance could not be obtained.

As mentioned above, according to the first aspect of the present invention, since the rubber composition in which the particulates having the specific structure are incorporated in a given amount is used as the rubber composition for the tread, satisfactory drivability and brakability are remarkably improved in dry-on-ice conditions as well as in wet-on-ice conditions, while cornering stability, durability and low fuel consumption required in the summer season or during running on ordinary roads are not almost deteriorated. Therefore, the pneumatic tire according to the present invention can be called the all-season tire in a real sense.

In the following, the second aspect of the present invention, will be explained with reference to specific examples.

Experiment 3

The compounding recipe and test results of tread rubbers will be shown in Tables 13 (Examples 2-1 through 2-10) and Table 14 (Comparative Examples 2-1 through 2-8). This Experiment 3 relates to the tests for performances of the above-mentioned small size tires.

In Examples 2-1 through 2-8 of Experiment 3, the matrix other than the particulates was a non-foamed rubber, and a foamed rubber was used in Examples 2-9 and 2-10.

Kinds and physical properties of the resin-composite particulates in Tables 13 and 14 are shown in Table 15.

The resin-composite particulates A through H fall in the scope of the present invention, and the resin-composite particulates I through M fall outside the scope of the invention.

TABLE 13

|  |  | Example ||||||||||
|  |  | 2-1 | 2-2 | 2-3 | 2-4 | 2-5 | 2-6 | 2-7 | 2-8 | 2-9 | 2-10 |
|---|---|---|---|---|---|---|---|---|---|---|---|
| Compounding recipe | natural rubber | 60 | 60 | 60 | 60 | 60 | 60 | 60 | 60 | 60 | 60 |
|  | butadiene rubber | 40 | 40 | 40 | 40 | 40 | 40 | 40 | 40 | 40 | 40 |
|  | carbon black N220 | 60 | 60 | 60 | 60 | 60 | 60 | 60 | 60 | 60 | 60 |
|  | process oil | 5 | 5 | 5 | 5 | 5 | 5 | 5 | 5 | 5 | 5 |
|  | stearic acid | 1.5 | 1.5 | 1.5 | 1.5 | 1.5 | 1.5 | 1.5 | 1.5 | 1.5 | 1.5 |
|  | zinc oxide | 3.0 | 3.0 | 3.0 | 3.0 | 3.0 | 3.0 | 3.0 | 3.0 | 3.0 | 3.0 |
|  | antioxidant | 1.0 | 1.0 | 1.0 | 1.0 | 1.0 | 1.0 | 1.0 | 1.0 | 1.0 | 1.0 |
|  | vulcanization accelerator | 1.5 | 1.5 | 1.5 | 1.5 | 1.5 | 1.5 | 1.5 | 1.5 | 1.5 | 1.5 |
|  | sulfur | 1.8 | 1.8 | 1.8 | 1.8 | 1.8 | 1.8 | 1.8 | 1.8 | 1.8 | 1.8 |
|  | foaming agent (ADCA) | — | — | — | — | — | — | — | — | 3.0 | 3.0 |
|  | urea | — | — | — | — | — | — | — | — | 2.8 | 2.8 |
|  | resin-composite kind | A | B | C | D | E | F | G | H | B | B |
|  | particulates amount | 20 | 20 | 20 | 20 | 20 | 20 | 20 | 20 | 20 | 10 |
| physical property of tread rubber | foaming rate (%) | — | — | — | — | — | — | — | — | 19 | 18 |
|  | coefficient of friction on ice × $10^{-2}$ | 5.3 | 5.7 | 5.8 | 6.0 | 5.1 | 5.9 | 6.1 | 5.0 | 6.4 | 6.1 |
| Tire performance | wet skid resistance | 103 | 102 | 100 | 100 | 103 | 101 | 101 | 100 | 104 | 103 |
|  | brakability on ice | 129 | 134 | 135 | 136 | 127 | 135 | 138 | 127 | 143 | 139 |
|  | wear resistance | 101 | 100 | 99 | 99 | 101 | 100 | 99 | 100 | 97 | 99 |

TABLE 14

|  |  | Comparative Example | | | | | | |
|---|---|---|---|---|---|---|---|---|
|  |  | 1-1 | 1-2 | 1-3 | 1-4 | 1-5 | 1-6 | 1-7 |
| Compounding recipe | natural rubber | 60 | 60 | 60 | 60 | 60 | 60 | 60 |
|  | butadiene rubber | 40 | 40 | 40 | 40 | 40 | 40 | 40 |
|  | carbon black N220 | 60 | 60 | 60 | 60 | 60 | 60 | 60 |
|  | process oil | 5 | 5 | 5 | 5 | 5 | 5 | 5 |
|  | stearic acid | 1.5 | 1.5 | 1.5 | 1.5 | 1.5 | 1.5 | 1.5 |
|  | zinc oxide | 3.0 | 3.0 | 3.0 | 3.0 | 3.0 | 3.0 | 3.0 |
|  | antioxidant | 1.0 | 1.0 | 1.0 | 1.0 | 1.0 | 1.0 | 1.0 |
|  | vulcanization accelerator | 1.5 | 1.5 | 1.5 | 1.5 | 1.5 | 1.5 | 1.5 |
|  | sulfur | 1.8 | 1.8 | 1.8 | 1.8 | 1.8 | 1.8 | 1.8 |
|  | foaming agent (ADCA) | — | — | — | — | — | — | — |
|  | urea | — | — | — | — | — | — | — |
|  | resin-composite kind | I | J | K | L | M | B | — |
|  | particulates amount | 20 | 20 | 20 | 20 | 20 | 3 | — |
| physical property of tread rubber | foaming rate (%) | — | — | — | — | — | — | — |
|  | coefficient of friction on ice $\times 10^{-2}$ | 4.4 | 4.5 | 4.3 | 3.2 | 4.5 | 2.1 | 2.1 |
| Tire performance | wet skid performance | 99 | 98 | 98 | 99 | 98 | 101 | 100 |
|  | brakability on ice | 121 | 120 | 119 | 108 | 121 | 100 | 100 |
|  | wear resistance | 101 | 99 | 100 | 100 | 102 | 101 | 100 |

TABLE 15

| Kind of resin-composite particulates |  | A | B | C | D | E | F | G | H | I | J | K | L | M |
|---|---|---|---|---|---|---|---|---|---|---|---|---|---|---|
| Average particle diameter of resin-composite particulates (μm) |  | 120 | 120 | 120 | 120 | 120 | 120 | 310 | 18 | 120 | 120 | 2.5 | 120 | 120 |
| Melting point of crystalline resin (°C.) |  | 140 | 140 | 140 | 140 | 140 | 140 | 170 | 140 | 140 | 140 | 140 | 87 | 140 |
| Master batch of carbon black | $N_2$ specific surface area $\times$ m²/g | 83 | 114 | 143 | 197 | 114 | 114 | 114 | 114 | 42 | 114 | 114 | 114 | 82 |
|  | Y weight parts (PHR) | 50 | 50 | 50 | 50 | 20 | 70 | 50 | 50 | 20 | 10 | 50 | 50 | 16 |
|  | X + 10Y | 583 | 614 | 643 | 697 | 314 | 814 | 614 | 614 | 242 | 214 | 614 | 614 | 242 |

As mentioned above, in Examples 2-1 through 2-10, the coefficient of friction on ice of the tread rubber could be made far greater as compared with the comparative examples, while wear resistance or wet skid resistance was not deteriorated. Thus, it is seen that when such a rubber composition is used in the pneumatic tire, brakability on ice can be largely improved.

Particularly, it is seen that in Examples 2-9 and 2-10 using the foamed rubber as the matrix of the tread rubber, brakability on ice and wet roads could be remarkably improved.

To the contrary, in Comparative Examples 2-1 through 2-6, the resin-composite particles I to M were incorporated, and in Comparative Example 3-7, the compounding ratio of the particulates fell outside the scope of the present invention. In these Comparative Examples 2-1 through 2-6 and 3-7, brakability on ice and wet roads was at low levels.

Experiment 4:

Table 16 shows the compounding recipe and test results of tread rubbers (Examples 2-11 through 2-13 and Comparative Examples 2-8 through 2-11). Experiment 4 relates to test results of performances of the above-mentioned large size tires.

In Examples 2-11 and 2-12 of Experiment 4, the matrix other than the particulates was a non-foamed rubber, and in Example 2-13, the matrix was a foamed rubber.

The kinds of the resin-composite particulates are shown in Table 15.

TABLE 16

|  |  | Example | | | Comparative Example | | | |
|---|---|---|---|---|---|---|---|---|
|  |  | 2-11 | 2-12 | 2-13 | 2-8 | 2-9 | 2-10 | 2-11 |
| Compounding recipe | natural rubber | 100 | 100 | 100 | 100 | 100 | 100 | 100 |
|  | carbon black N110 | 45 | 45 | 45 | 45 | 45 | 45 | 45 |
|  | process oil | 10 | 10 | 10 | 10 | 10 | 10 | 10 |
|  | stearic acid | 2 | 2 | 2 | 2 | 2 | 2 | 2 |
|  | zinc oxide | 2.5 | 2.5 | 2.5 | 2.5 | 2.5 | 2.5 | 2.5 |
|  | antioxidant | 1 | 1 | 1 | 1 | 1 | 1 | 1 |
|  | vulcanization accelerator | 1 | 1 | 1 | 1 | 1 | 1 | 1 |
|  | sulfur | 1.5 | 1.5 | 1.5 | 1.5 | 1.5 | 1.5 | 1.5 |

TABLE 16-continued

|  |  | Example | | | Comparative Example | | | |
|---|---|---|---|---|---|---|---|---|
|  |  | 2-11 | 2-12 | 2-13 | 2-8 | 2-9 | 2-10 | 2-11 |
|  | foaming agent (OBSH) | — | — | 4.0 (foaming rate 19%) | — | — | — | — |
|  | resin-composite kind | B | F | B | — | J | I | M |
|  | particulates amount | 20 | 20 | 15 | — | 20 | 20 | 20 |
| Physical property of tread rubber | coefficient of friction on ice × $10^{-2}$ | 6.0 | 5.9 | 6.3 | 2.3 | 5.3 | 4.8 | 4.8 |
| Tire performance | brakability on ice | 127 | 130 | 137 | 100 | 115 | 113 | 111 |
|  | wear resistance | 101 | 99 | 96 | 100 | 97 | 96 | 99 |

As shown above, in Examples 2-11 through 2-13, the coefficient of friction on ice of the tread rubber was far increased as compared with Comparative Examples, while wear resistance was not deteriorated. Thus, when the rubber composition in any one of Examples 2-11 through 2-13, brakability on ice can be remarkably improved.

In particular, it is seen that in Example 2-13 using the foamed rubber in the matrix of the tread rubber, brakability on ice has been greatly improved.

To the contrary, Comparative Example 2-8 containing no resin particulates and Comparative Examples 2-9 and 2-11 containing the particulates falling outside the scope of the present invention, brakability on ice was at low levels.

As mentioned above, since the pneumatic tire of the present invention uses, as the tread rubber, the rubber composition in which a given amount of resin-composite particulates composed of the syndiotactic-1,2-polybutadiene resin and the carbon black are used and optionally further the matrix of the rubber composition other than the particulates is made of the foamed rubber, the present invention can actually provide the so-called all season tire and the studless tires having drivability and brakability on dry-on-ice road as well as on wet-on-ice roads remarkably improved, while neither cornering stability nor wear resistance in the summer season are deteriorated.

While the invention has been described in detail and with reference to specific embodiments thereof, it will be apparent to one of ordinary skill in the art that various changes and modifications can be made therein without departing from the spirit and scope thereof.

What is claimed is:

1. A rubber composition comprising a rubber component and 5 to 60 parts by weight of particulates of a crystalline syndiotactic-1,2-polybutadiene resin relative to 100 parts by weight of said rubber component, wherein:

(a) said particulates have an average particle diameter of 10 to 500 μm, wherein the average particle diameter of the particulates is measured by using an air jet sieve grain size meter analysis, (b) said crystalline syndiotactic-1,2-polybutadiene resin has a melting point of not less than 110° C., and (c) said particulates have an average ratio is between a major axis and a minor axis of not more than 6.

2. The rubber composition according to claim 1, wherein the melting point of the crystalline resin is 115° C. to 200° C.

3. The rubber composition according to claim 2, wherein the melting point of the crystalline resin is 120° C. to 195° C.

4. The rubber composition according to claim 1, wherein the average particle diameter of the particulates is 10 μm to 480 μm.

5. The rubber composition according to claim 4, wherein the average particle diameter of the particulates is 100 μm to 480 μm.

6. The rubber composition according to claim 1, wherein the rubber component is at least one rubber selected from the group consisting of natural rubber, polyisoprene rubber, polybutadiene rubber, styrene-butadiene copolymer rubber, butyl rubber, halogenated butyl rubber, and ethylene-propylene diene rubber.

7. The rubber composition according to claim 3, wherein the melting point of the crystalline resin is 140° C. to 180° C.

8. The rubber composition according to claim 1, wherein the rubber composition is produced by kneading at a kneading temperature and vulcanizing at a vulcanizing temperature, and the melting point of the resin is higher than the kneading temperature and the vulcanizing temperature.

9. The rubber composition according to claim 1, wherein the rubber composition is produced by mixing a rubber component which has already been polymerized, particulates of the syndiotactic-1,2-polybutadiene resin, and a vulcanizing agent to form a mixture, and kneading and vulcanizing the mixture.

10. A rubber composition comprising a rubber component and 5 to 60 parts by weight of particulates of a crystalline syndiotactic-1,2-polybutadiene resin relative to 100 parts by weight of said rubber component, wherein:

(a) said particulates have an average particle diameter of 10 to 500 μm, wherein the average particle diameter of the particulates is measured by using an air jet sieve grain size meter analysis, (b) said crystalline syndiotactic-1,2-polybutadiene resin has a melting point of not less than 110° C., and (c) said crystalline syndiotactic-1,2-polybutadiene resin has a reduced viscosity $\eta_{sp}/c$ of not less than 0.70.

11. The rubber composition according to claim 10, wherein the particulates have an average ratio between a major axis and a minor axis of not more than 6.

12. The rubber composition according to claim 10, wherein the melting point of the crystalline resin is 115° C. to 200° C.

13. The rubber composition according to claim 12, wherein the melting point of the crystalline resin is 120° C. to 195° C.

14. The rubber composition according to claim 13, wherein the melting point of the crystalline resin is 140° C. to 180° C.

15. The rubber composition according to claim 10, wherein the particulates have an average particle diameter of from 10 to 480 μm.

16. The rubber composition according to claim 15, wherein the particulates have an average particle diameter of from 100 to 480 μm.

17. The rubber composition according to claim 10, wherein the reduced viscosity $\eta_{sp}/c$ is from 0.9 to 5.0.

18. The rubber composition according to claim 10, wherein the rubber component is at least one rubber selected from the group consisting of natural rubber, polyisoprene rubber, polybutadiene rubber, styrene-butadiene copolymer rubber, butyl rubber, halogenated butyl rubber, and ethylene-propylene diene rubber.

19. The rubber composition according to claim 10, wherein the rubber composition is produced by kneading at a kneading temperature and vulcanizing at a vulcanizing temperature, and the melting point of the resin is higher than the kneading temperature and the vulcanizing temperature.

20. The rubber composition according to claim 10, wherein the rubber composition is produced by mixing a rubber component which has already been polymerized, particulates of the syndiotactic-1.2-polybutadiene resin, and a vulcanizing agent to form a mixture, and kneading and vulcanizing the mixture.

21. A pneumatic tire comprising a tread composed of a rubber composition, said rubber composition including a rubber component and particulates of a crystalline syndiotactic-1.2-polybutadiene resin, the particulates having an average particle diameter of 10 to 500 μm, a melting point of said crystalline syndiotactic-1.2-polybutadiene resin being not less than 110° C., and a compounding ratio of the resin being 5 to 60 parts by weight relative to 100 parts by weight of the rubber composition, wherein an average ratio between a major axis and a minor axis of the resin particulates is not more than 6, and wherein the average particle diameter of the particulates is measured by using an air jet sieve grain size meter analysis.

22. The pneumatic tire according to claim 21, wherein a matrix portion of the rubber composition of the tread rubber is a foamed rubber.

23. The pneumatic tire according to claim 21, wherein the tread has a cap-and-base construction, and said rubber composition is used in the cap.

24. The pneumatic tire according to claim 22, wherein a foaming rate of the tread rubber is 3 to 35.

25. The pneumatic tire according to claim 21, wherein the rubber component is selected from the group consisting of natural rubber, polyisoprene rubber, polybutadiene rubber, styrene-butadiene copolymer rubber, styrene-isoprene-butadiene terpolymer, styrene-isoprene copolymer rubber, and isoprene-butadiene copolymer rubber.

26. The pneumatic tire according to claim 21, wherein the particulates having the average particle diameter of 10 to 500 μm are resin-composite particulates composed of a crystalline syndiotactic-1.2-polybutadiene resin having a melting point of not less than 110° C. and a carbon black, a compounding ratio of the resin-composite particulates being 5 to 60 parts by weight relative to 100 parts by weight of the rubber component, and the resin and the carbon black satisfying the following inequalities: $250<X+10Y<1300$ in which X is a nitrogen-adsorption specific surface area (unit: $m^2/g$) and Y is the compounding ratio of the carbon black (parts by weight) relative to 100 parts by weight of the resin.

27. The pneumatic tire according to claim 26, wherein the rubber component constituting a matrix portion of the rubber composition of the tread rubber other than the particulates is a foamed rubber.

28. The pneumatic tire according to claim 27, wherein a foaming rate of the tread rubber is 3 to 35.

29. The pneumatic tire according to claim 26, wherein the rubber component is selected from the group consisting of natural rubber, polyisoprene rubber, polybutadiene rubber, styrene-butadiene copolymer rubber, styrene-isoprene-butadiene terpolymer, styrene-isoprene copolymer rubber, and isoprene-butadiene copolymer rubber.

30. The pneumatic tire according to claim 21, wherein the average ratio between the major axis and the minor axis of the resin particulates is not more than 4.

31. The pneumatic tire according to claim 21, wherein the average particle diameter ranges from 18 to 310 μm.

* * * * *